United States Patent [19]

Sano et al.

[11] Patent Number: 4,522,416
[45] Date of Patent: Jun. 11, 1985

[54] VEHICULAR STEERING SYSTEM

[75] Inventors: Shoichi Sano, Tokyo; Yoshimi Furukawa, Saitama, both of Japan

[73] Assignee: Honda Giken Kogyo Kabushiki Kaisha, Tokyo, Japan

[21] Appl. No.: 407,421

[22] Filed: Aug. 12, 1982

[30] Foreign Application Priority Data

| Aug. 13, 1981 | [JP] | Japan | 56-127349 |
| Dec. 2, 1981 | [JP] | Japan | 56-194249 |
| Jun. 1, 1982 | [JP] | Japan | 57-93394 |
| Jun. 1, 1982 | [JP] | Japan | 57-93398 |
| Jun. 2, 1982 | [JP] | Japan | 57-94355 |

[51] Int. Cl.$^3$ .............................. B62D 7/00
[52] U.S. Cl. ..................... 280/91; 74/496; 74/498
[58] Field of Search ............... 180/140, 234, 236, 240; 280/771, 91, 95 R, 95 A, 96, 98, 99, 103; 74/39, 40, 42, 43, 50, 89, 89.16, 89.2, 496, 498

[56] References Cited

U.S. PATENT DOCUMENTS

| 2,286,552 | 6/1942 | Klose | 74/48 |
| 2,944,829 | 7/1960 | Herbenar | 280/95 A |
| 2,984,998 | 5/1961 | Liebrandt et al. | 74/43 |
| 3,411,803 | 11/1968 | Melton et al. | 280/95 A |
| 3,540,754 | 11/1970 | Schmidt | 280/96 |
| 4,406,472 | 9/1983 | Furukawa | 280/91 |

Primary Examiner—Joseph F. Peters, Jr.
Assistant Examiner—Ross Weaver
Attorney, Agent, or Firm—Irving M. Weiner; Pamela S. Burt

[57] ABSTRACT

A vehicular steering system including a steering wheel, a front wheel steering mechanism for steering a front wheel according to steering amounts of the steering wheel, and a rear wheel steering mechanism for steering a rear wheel according to such steering amounts in the same direction as that of the front wheel when such steering amounts are relatively small and in a direction opposite to the steering direction of the front wheel when such steering amounts are relatively large. The rear wheel steering mechanism includes a crank member connected to the steering wheel, a movable member connected to the crank member, a restriction mechanism for restraining the movable member and permitting the latter to perform only restricted movements along a predetermined pattern, and an output mechanism interconnecting the movable member and the rear wheel for effecting the steering of the rear wheel according to components of motion in a predetermined direction of such restricted movements.

The steering system is capable of steering front and rear wheels in the same direction in response to relatively small steering amounts of a steering wheel and in opposite directions in response to relatively large steering amounts of the steering wheel, and is provided in a compact construction.

37 Claims, 33 Drawing Figures

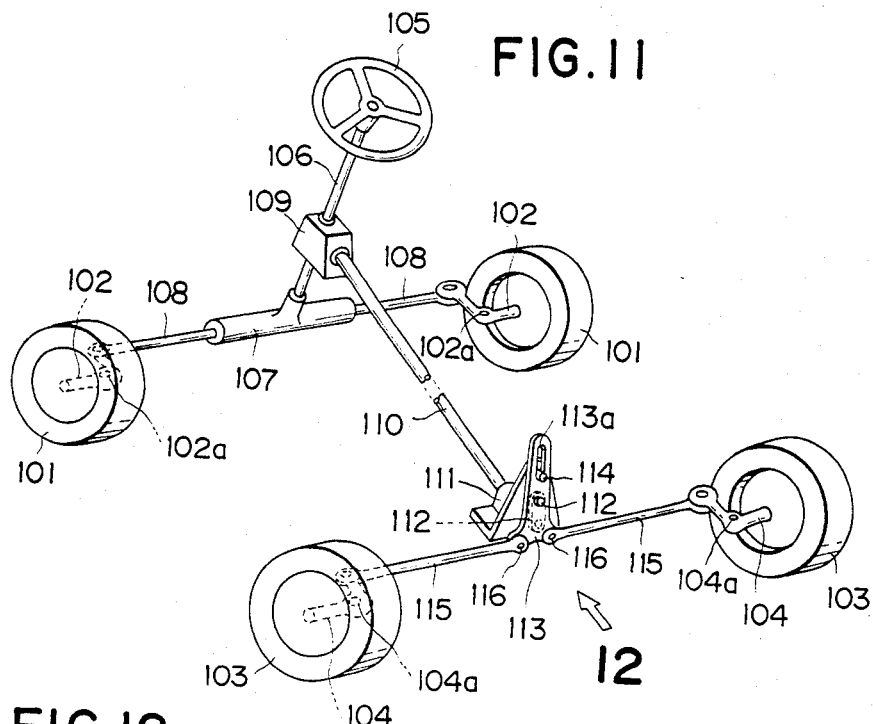
FIG. 11
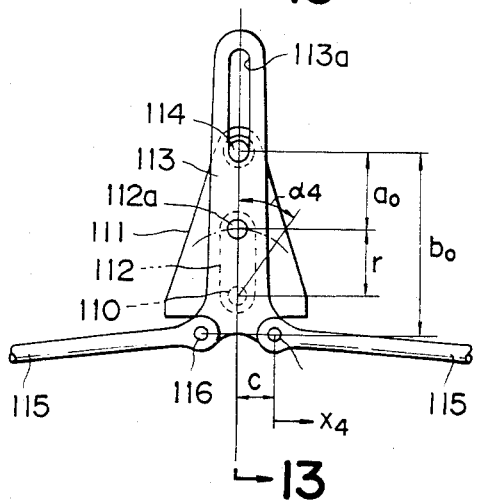
FIG. 12
FIG. 13

VEHICULAR STEERING SYSTEM

BACKGROUND OF THE INVENTION

1. Field of the Invention

The present invention relates generally to a vehicular steering system. More particularly, the invention relates to a vehicular steering system wherein front and rear wheels are steered by operation of a steering wheel.

2. Description of Relevant Art

The present applicants have previously provided a vehicular steering system wherein both front and rear wheels are steered by operation of a steering wheel whereby problems associated with vehicles of the type wherein only front wheels are steered, such as the difference in generation time of a lateral force between front and rear wheels and the disagreement between the vehicular direction and the tangential direction of turning locus, can be overcome. In such a vehicle, it is desirable to steer the rear wheel in the manner described hereinbelow together with steering of the front wheel in consideration of the fact that the steering angle of the steering wheel operated by the vehicle driver substantially differs in accordance with travelling speeds of the vehicle.

When the aforesaid vehicle is travelling at a relatively high speed, the steering wheel is rotated a relatively small angular extent and in this case the rear wheel is steered in the same direction as that of the front wheel so as to improve the steering performance of the vehicle. On the other hand, when the vehicle is travelling at a relatively low speed, the steering wheel is rotated a relatively large angular extent and in this case the rear wheel is steered in a direction opposite to that of the front wheel, so as to improve the turning operability of the steering wheel. In this latter case, in some particular uses of the vehicle it is desirable to maintain the steering angle of the rear wheel at substantially zero so that the turning operability of the steering wheel is substantially the same as that of conventional vehicles wherein only the front wheel is steered.

The present invention effectively overcomes the aforementioned problems in the field of vehicular steering systems by providing a novel vehicular steering system construction.

SUMMARY OF THE INVENTION

The present invention provides a vehicular steering system for a vehicle provided with at least one front wheel and at least one rear wheel, which steering system comprises a steering wheel; front wheel steering means for steering the front wheel at angles according to steering angles of the steering wheel in directions responsive to steering directions of the steering wheel; and rear wheel steering means for steering the rear wheel at angles according to steering angles of the steering wheel in the same steering directions as that of the front wheel when the steering angles are relatively small and in steering directions opposite to that of the front wheel when the steering angles are relatively large. The rear wheel steering means comprises a crank member operatively connected to the steering wheel, a movable member connected to the crank member, restriction means for restricting the movable member to permit only restricted motions on a predetermined curved pattern, and an output mechanism connected between the movable member and the rear wheel which performs the aforesaid steering of the rear wheels in accordance with components of motion in a predetermined direction of the aforesaid restricted motions.

It is an object of the present invention to provide a vehicular steering system for a vehicle wherein both the front and rear wheels are steered by operation of a steering wheel, which is capable of steering the rear wheel in the same direction as that of the front wheel when the steering angle of the steering wheel is relatively small, is capable of steering the rear wheel in a direction opposite to that of the front wheel when the steering angle of the steering wheel is relatively large, and in some particular usages, is further capable of maintaining the steering angle of the rear wheel in the latter case at substantially zero.

It is another object of the present invention to provide a vehicular steering system having a rear wheel steering mechanism of a compact construction so as to maintain desired rear suspension characteristics while at the same time attaining the aforesaid objects.

Preferred embodiments of the present invention will be described in detail hereinbelow with reference to the accompanying drawings, from which further features, objects and advantages of the invention will become apparent.

BRIEF DESCRIPTION OF THE DRAWINGS

FIG. 11 is a schematic perspective view showing a basic structure of a four-wheeled vehicle provided with a steering system in accordance with a fourth embodiment of the present invention.

FIG. 12 is an enlarged view showing principal portions of the steering system of FIG. 11, viewed from the direction of arrow 12 in FIG. 11.

FIG. 13 is a sectional view taken along line 13—13 of FIG. 12.

DETAILED DESCRIPTION OF PREFERRED EMBODIMENTS

Figure 1:
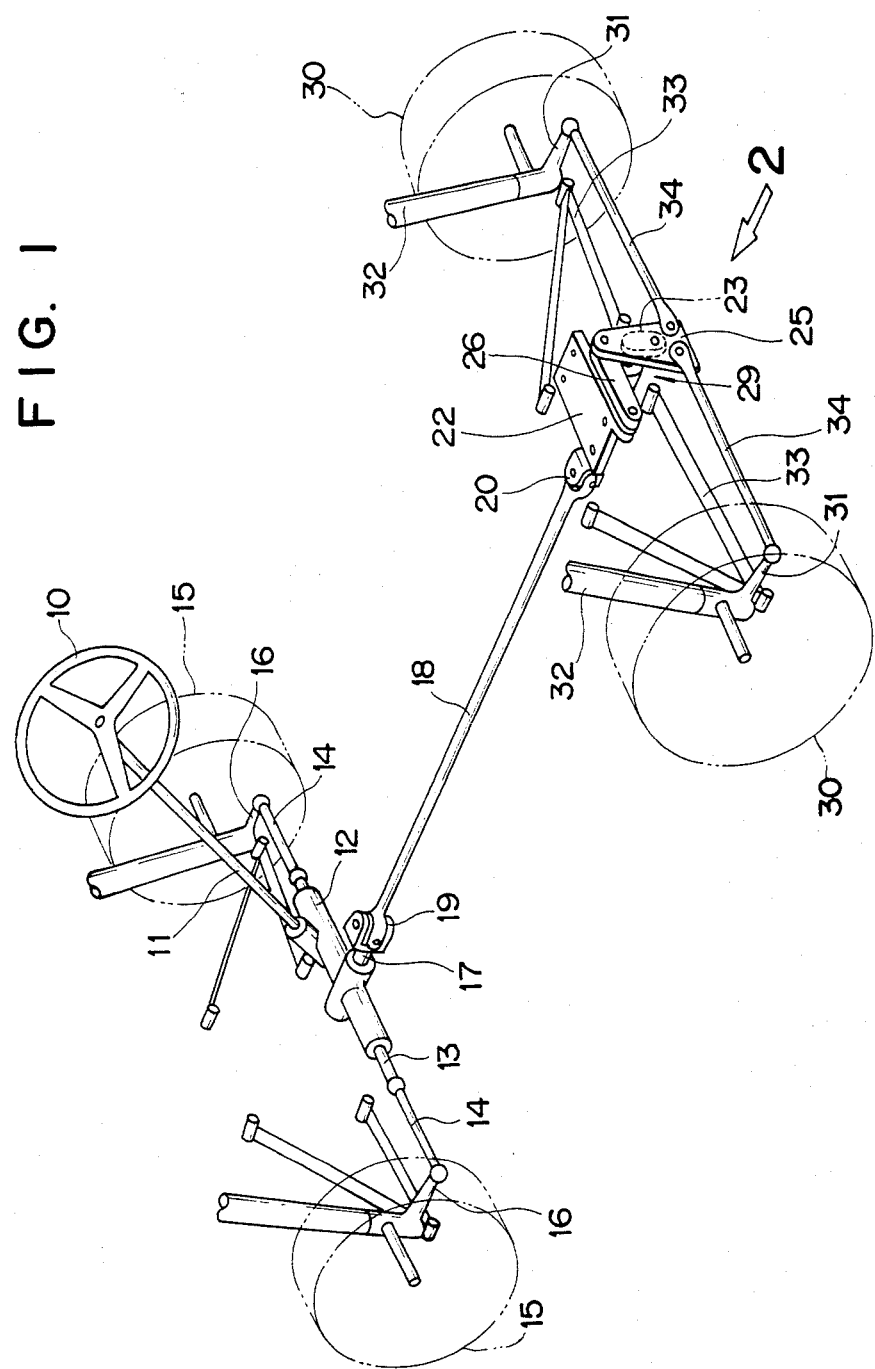
FIG. 1 is a schematic perspective view showing a basic structure of a four-wheeled vehicle provided with a steering system in accordance with a first embodiment of the present invention.

With reference to FIG. 1, reference numeral 10 designates a steering wheel to be operated by the vehicle driver. The steering wheel 10 is connected through a steering shaft 11 to a rack and pinion type direction switching mechanism (not shown) which is mounted within a gear box 12. A pivotal movement of the steering wheel 10 is converted to a movement of right and left front wheel steering tie rods 14 in the transverse direction of the vehicle body through a connecting rod 13 by means of the direction switching mechanism. Outer end portions of the tie rods 14 are connected to knuckle arms 16 which support front wheels 15 and which are pivotable in the right and left direction. By the aforesaid movement of the tie rods 14, the front wheels 15 are steered in the steering direction of the steering wheel 10. Such a construction of a front wheel steering mechanism is well known, and by attaching a power steering system to the gear box 12 the turning operation of the steering wheel 10 is assisted by the power steering system.

The gear box 12 further incorporates therein an operating force transmission mechanism (not shown) comprising bevel and worm gears and interlocked with the direction switching mechanism. Through such transmission mechanism, a pivotal movement of the steering shaft 11 is transmitted to a rearwardly projecting connecting shaft 17. Connected to the connecting shaft 17 through a universal joint 19 is the fore end of an operating shaft 18 which extends substantially in the longitudinal direction of the vehicle body.

Figure 2:
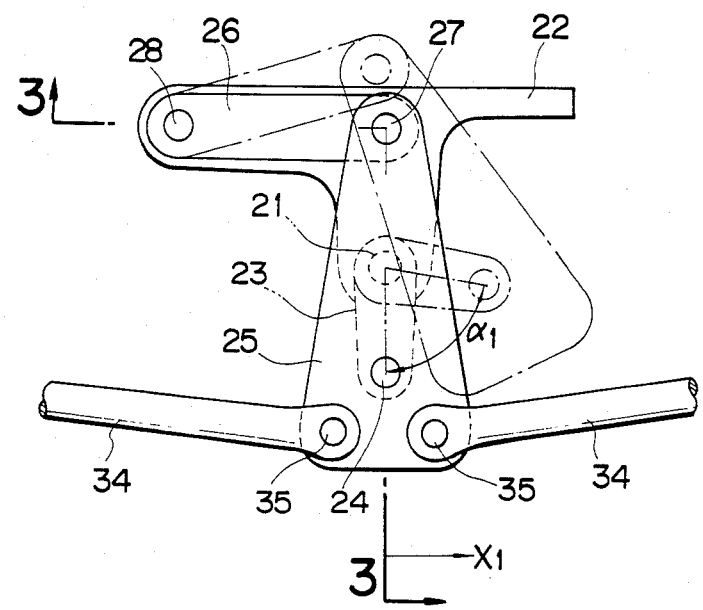
FIG. 2 is an enlarged view showing principal portions of the steering system of FIG. 1, viewed from the direction of arrow 2 in FIG. 1.
Figure 3:
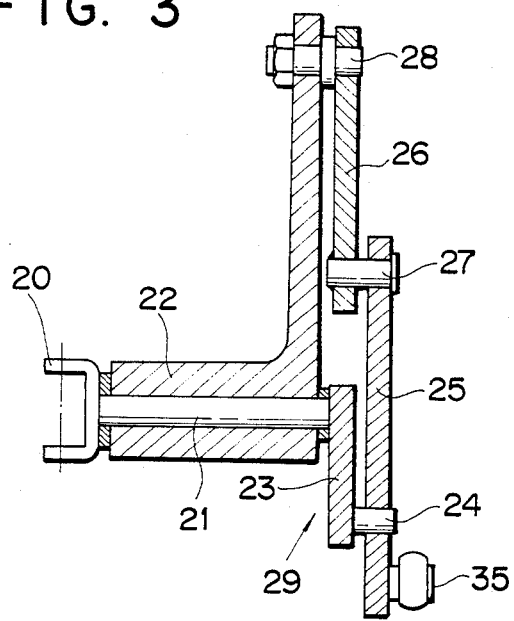
FIG. 3 is a sectional view taken along line 3—3 of FIG. 2.

Referring now to FIGS. 2 and 3, an input shaft 21 of a rear wheel steering mechanism 29 is connected to the rear end of the operating shaft 18 through a universal joint 20. The input shaft 21, which extends substantially in the longitudinal direction of the vehicle body, is pivotably supported by a bearing bracket 22 comprising a relatively stationary member secured to the vehicle body. Consequently, when the steering wheel 10 is turned, the operating shaft 18 is pivoted through the internal mechanism of the gear box 12 and the connecting shaft 17, so that the input shaft 21 is pivoted in operative cooperation with the steering wheel 10.

To the rear end portion of the input shaft 21 projecting from the rear end face of the bracket 22 is integrally secured a crank member 23. The crank member 23, which has a predetermined length in the direction of the outside diameter of the input shaft 21, is adapted to pivot about its base end, i.e., the end thereof connected to the input shaft 21. When the vehicle is moving straight ahead, i.e., when the steering wheel 10 is in the neutral position thereof, the crank member 23 assumes a substantially vertical orientation as shown in broken line in FIG. 2. To the tip end of the crank member 23, i.e., to the end portion thereof opposite to the end connected to the input shaft 21, is secured a rearwardly projecting pin 24, and by means of the pin 24 a plate-like link member 25 having a substantially triangular configuration, as shown in FIG. 2, is connected to the crank member 23. The link member 25 is pivotable in the generally orthogonal plane thereof with respect to the pin 24, and when the crank member 23 is in its vertical orientation as mentioned above, the link member 25 also assumes a substantially vertical orientation. To the top portion of the link member 25 is connected by means of pin 27 one end of a rocker arm 26 of a predetermined length, the constant position of which is substantially in the transverse direction of the vehicle body. The other end of the arm 26 is connected substantially vertically pivotably by means of pin 28 to the bracket 22 which is a stationary member.

The input shaft 21, crank member 23, link member 25 and rocker arm 26 define a rear wheel steering mechanism 29. When the crank member 23 pivots integrally with the input shaft 21, the link member 25 also moves accordingly, but because the arm 26 adapted to pivot about the pin 28 is connected to the link member 25, the arm 26 restrains the link member 25 from moving freely, so that with the arm 26 thus functioning as a restraint member the link member 25 is permitted to move in a pivotal motion or a so-called coupler motion wherein the top portion moves in a substantially vertical direction, i.e., in the direction of the circumferential locus of the pin 27, and the lower portion moves in the transverse, right and left direction of the vehicle body, i.e., in the direction of the circumferential locus of the pin 24. In this case, provided that the link member 25 can be restrained to move in a predetermined pattern of motion, at least a pivotal motion having a moving component in substantially the right and left direction, another suitable restraint member may alternatively be employed instead of rocker arm 26.

Referring again to FIG. 1, right and left rear wheels 30 of the vehicle are supported by right and left pivotable knuckle arms 31. The knuckle arms 31 are suspended by right and left shock absorbers 32, the upper ends of which are suspended from the vehicle body, and also by right and left lower arms 33, the inner ends of which are secured vertically pivotably to the vehicle body. To satisfactorily define such rear suspension, the lower arms 33 are each constructed of a relatively long member. To the right and left knuckle arms 31 are connected corresponding outer ends of right and left rear wheel steering tie rods 34. The rear wheels 30 are steered in accordance with the pivotal movements to the right and left of the knuckle arms 31 based on a reciprocative linear motion of the tie rods 34 in the transverse direction of the vehicle body.

Referring again to FIGS. 2 and 3, the inner end portions of the right and left rear wheel steering tie rods 34 are connected by means of pins 35 to the lower portion of the link member 25 in predetermined positions and at approximately the same height. Alternatively, the inner end portions of both tie rods 34 may be connected to the link member 25 in common with a single pin. In this first embodiment of the present invention, the link member 25 is connected to the crank member 23 by means of the pin 24 in a substantially intermediate position of the upper and lower connections at which the rocker arm 26 and the right and left rear wheel steering tie rods 34 are connected with pins 27 and 35, respectively.

Because the lower arms 33 are relatively long as previously noted, the right and left rear wheel steering tie rods 34 are also correspondingly long, but the link member 25 serving as an output member of the rear wheel steering mechanism 29 to which are connected the inner ends of the tie rods 34, can be relatively short in the transverse direction of the vehicle body, thus permitting a compact construction of the rear wheel steering mechanism 29, and particularly permitting the opposed inner ends of the tie rods 34 to be connected in close proximity to each other to the link member 25. Thus, even if the tie rods extending in the transverse direction of the vehicle body are elongated, it is not necessary to enlarge the vehicle width as a whole.

The following description relates to the operation of the vehicular steering system according to the hereinabove described first embodiment of the invention.

When the steering wheel 10 is turned to the left, the front wheels 15 are steered to the left, while the crank member 23 and the link member 25 move pivotally as shown in chain line in FIG. 2 to steer the rear wheels 30 through the tie rods 34. On the other hand, when the steering wheel 10 is turned to the right, the steering direction of the front wheels 15 and the pivoting direction of the crank member 23 and link member 25 are reversed. If a power steering system is attached to the gear box 12, the steering of the rear wheels is effected with the aid of power from the power steering system simultaneously with steering of the front wheels. In this connection, a power steering system for the rear wheels, separate from that for the front wheels, may be mounted on the vehicle.

Figure 4:
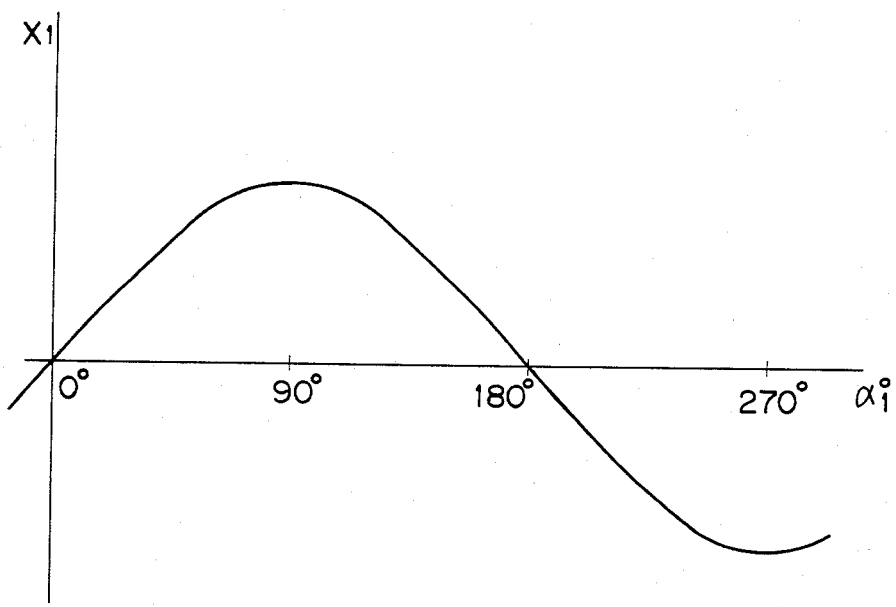
FIG. 4 is a graph showing the relationship between the pivoting angle of a crank member of a rear wheel steering mechanism in the steering system of FIG. 2 and the amount of a horizontal stroke of rear wheel steering tie rods.
Figure 5:
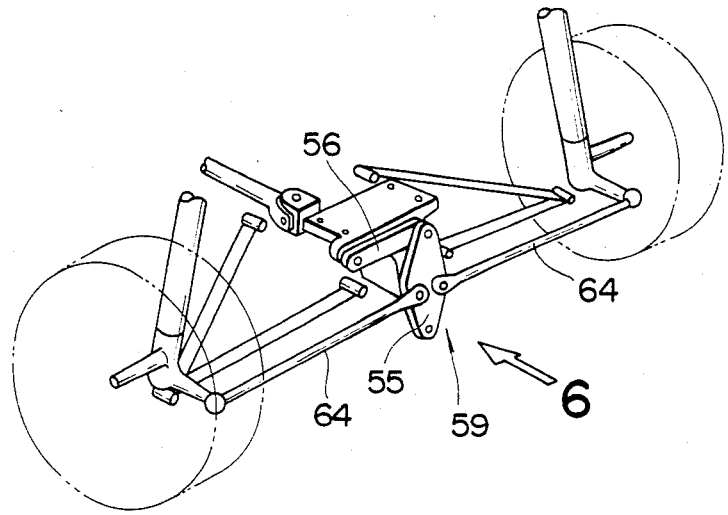
FIG. 5 is a schematic perspective view showing a basic structure of the rear portion of a four-wheeled vehicle provided with a steering system in accordance with a second embodiment of the present invention.
Figure 8:
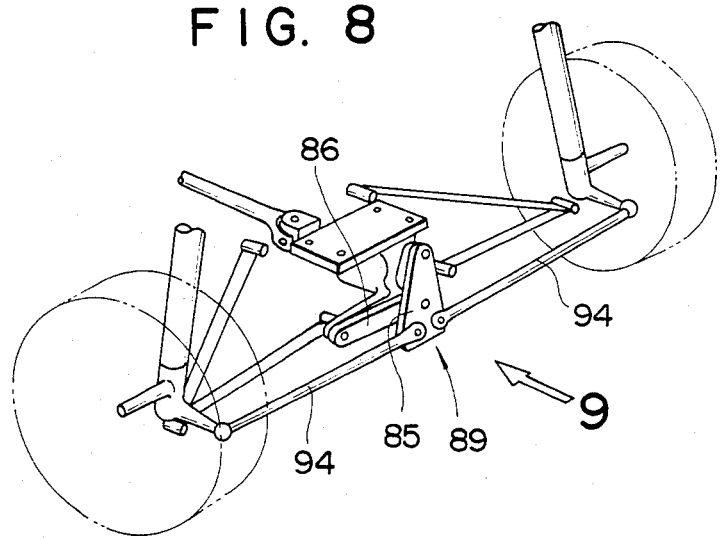
FIG. 8 is a schematic perspective view showing a basic structure of the rear portion of a four-wheeled vehicle provided with a steering system in accordance with a third embodiment of the present invention.

In FIG. 2, when the crank member 23 pivots by an angle of $\alpha_1°$, an increased horizontal moving stroke $X_1$ which corresponds to the magnitude of the pivotal angle $\alpha_1°$ is imparted to the tie rods 34 through the link member 25. In the graph of FIG. 4, this pivotal angle $\alpha_1°$ and the amount of stroke $X_1$ are plotted along the axis of abscissa and the axis of ordinate, respectively. As can be seen from FIG. 4, $X_1$ is substantially proportional to sine values of $\alpha_1°$ and therefore becomes maximum when $\alpha_1°$ is approximately 90°. When $\alpha_1°$ becomes approximately 180°, $X_1$ becomes zero, i.e., it returns to the normal position, and when $\alpha_1°$ exceeds this value, $X_1$ increases gradually in the opposite direction until it again becomes maximum at $\alpha_1°$ of approximately 270°. Consequently, when $\alpha_1°$ is between 0° and approximately 180°, the rear wheels 30 are each steered in the same direction as the front wheels 15, and when $\alpha_1°$ exceeds this range and is less than 360°, the rear wheels 30 are steered in a direction opposite to the steering direction of the front wheels 15.

In the foregoing, a difference in the stroke amount $X_1$ between the right and left tie rods 34 caused by a phase difference between the right and left pins 35 causes no substantial problem because the construction of the rear wheel steering mechanism 29 permits such phase difference to be set sufficiently small. Further, because the inner end of each tie rod 34 connected to the link member 25 also moves in the vertical direction in response to a pivotal movement of the link member 25, there occurs a shift in the value of the horizontal stroke amount $X_1$ corresponding to the pivotal angle $\alpha_1°$ between the aforesaid inner end and the outer end pivoted to the knuckle arm 31. However, such shift is substantially negligible because the construction of the rear wheel steering mechanism 29 permits the amount of vertical movement of the aforesaid inner end to be set sufficiently small in comparison with the length of the tie rod 34.

Preferably, a pivotal amount conversion mechanism comprising a gearing or the like is disposed in the rear wheel steering force transmission path extending from the steering wheel 10 to the link member 25, and by suitably setting the conversion ratio of such conversion mechanism the pivoting angle of the link member 25 is changed in a predetermined relation to that of the steering wheel 10. Thus, at a relatively small steering angle of the steering wheel 10 the front and rear wheels 15 and 30 are steered in the same direction, while at a relatively large steering angle thereof the rear wheels 30 are steered in a direction opposite to that of the front wheels 15, or at a relatively small steering angle of the steering wheel 10 the front and rear wheels 15 and 30 are steered in the same direction while at a relatively large steering angle thereof the rear wheels 30 are held at a steering angle of zero or close to zero.

The magnitude of steering angle of the rear wheels 30 is closely related to the lengths of crank member 23, link member 25 and rocker arm 26 and also to the interconnected positions of such members. Such factors for deciding the rear wheel steering angle are selected according to the ratio of rear wheel steering angle to front wheel steering angle, which ratio is considered desirable for the vehicle to which the steering system of the present invention is applied.

Referring now to FIGS. 5 through 7 and 8 through 10, reference numeral 59 or 89 represents the entirety of a rear wheel steering mechanism. Such mechanism is constructed of an input shaft 51 or 81 adapted to pivot in operative cooperation with a steering wheel (not shown), a crank member 53 or 83 connected to the input shaft 51 or 81 and having a predetermined length in the direction of the outside diameter of the input shaft, a link member 55 or 85 connected to the crank member 53 or 83, and a rocker arm 56 or 86 serving as a restraint member for restricting the motion of the link member 55 or 85, based on the pivotal movement of the crank member 53 or 83, to a coupler motion. To the link member 55 or 85 are connected right and left rear wheel steering tie rods 64 or 94.

Figure 6:
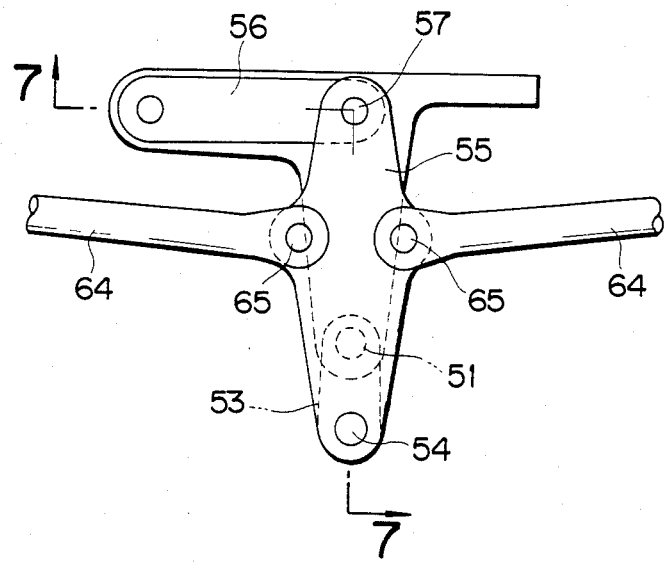
FIG. 6 is an enlarged view showing principal portions of the steering system of FIG. 5, viewed from the direction of arrow 6 in FIG. 5.
Figure 7:
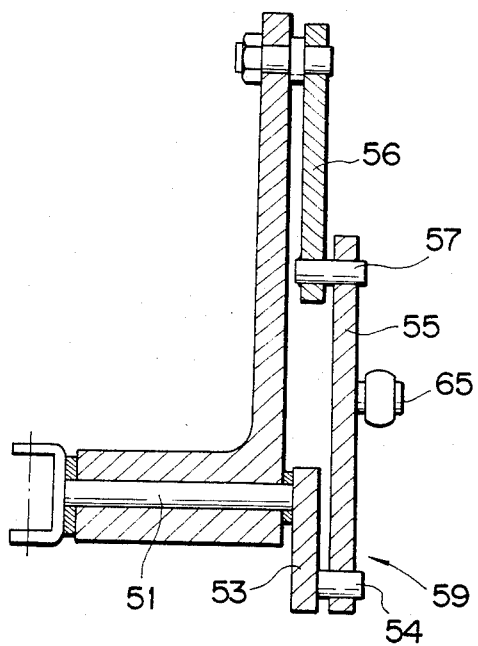
FIG. 7 is a sectional view taken along line 7—7 of FIG. 6.
Figure 9:
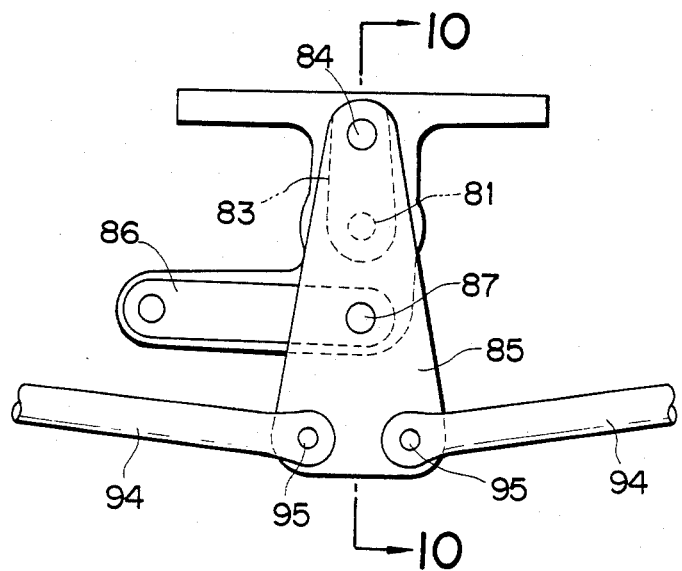
FIG. 9 is an enlarged view showing principal portions of the steering system of FIG. 8, viewed from the direction of arrow 9 in FIG. 8.
Figure 10:
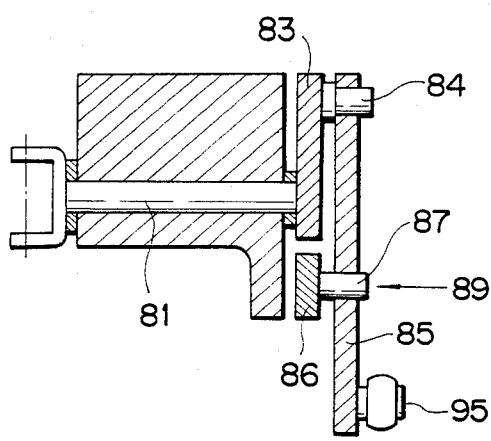
FIG. 10 is a sectional view taken along line 10—10 of FIG. 9.

As apparent from FIGS. 6 and 7, the link member 55 is connected to the crank member 53 by means of a pin 54 in a position lower than the upper and lower connections wherein the rocker arm 56 and the right and left tie rods 64 are connected to the link member 55 by means of an upper pin 57 and lower pins 65, respectively. In other words, the tie rods 64 are connected to the link member 55 in a substantially intermediate position between the rocker arm 56 and the crank member 53 which are spaced thereabove and therebelow. On the other hand, the link member 85, as shown in FIGS. 9 and 10, is connected to the crank member 83 by means of a pin 84 in a position higher than the upper and lower connections wherein the rocker arm 86 and the right and left tie rods 94 are connected to the link member 85 through an upper pin 87 and lower pins 95, respectively. In other words, the rocker arm 86 is connected to the link member 85 in a substantially intermediate position between the crank member 83 and the tie rods 94 which are spaced thereabove and therebelow.

Referring now to FIGS. 11 through 14, right and left front wheels 101 of a four-wheeled vehicle are supported by knuckle arms 102 which are pivotable to the right and left about shafts 102a, while right and left rear wheels 103 are also supported by knuckle arms 104 which are pivotable to the right and left about shafts 104a. Connected to a steering wheel 105 which the vehicle driver operates is a steering shaft 106, the lower end of which is received in a gear box 107. In the interior of the gear box 107 is incorporated, for example, a rack and pinion type motion conversion mechanism (not shown) for converting a pivotal movement of the steering shaft 106 induced by the steering wheel 105 into a linear motion in the right and left direction. The linear motion is taken out of the gear box 107 as a motion of right and left front wheel steering tie rods 108 which are connected to the knuckle arms 102 for the front wheels. Thus, when the steering wheel 105 is rotatably operated, the tie rods 108 are moved to the right or left, whereby the front wheels 101 are steered about the shafts 102a. Such a front wheel steering mechanism is already known.

Another gear box 109 is mounted on the steering shaft 106, and a shaft 110 extends from the gear box 109 in the rearward direction of the vehicle. The shaft 110 comprises an input shaft for transmitting and inputting a steering force of the steering wheel 105 to a rear wheel steering mechanism as will be described hereinbelow. The steering wheel 105 and the input shaft 110 are interconnected within the gear box 109 through, for example, a gearing mechanism comprising bevel and worm gears, and therefore the input shaft 110 pivots in operative cooperation with the steering shaft 105. The rear portion of the input shaft 110 is inserted into a stationary bracket 111 as a constituent member of the vehicle body and is thereby pivotably supported. To the rear end of the input shaft 110 projecting from the rear of the bracket 111 is fixed a crank member 112 as shown in FIG. 13. The crank member 112 has a predetermined length in the direction of the outside diameter of the input shaft 110 which also serves as a pivot shaft of the crank member 112, and to its tip end portion is fixed a rearwardly projecting pin 112a. The pin 112a is pivotably received in a hole 113b formed in a link member 113, i.e., the crank member 112 and the link member 113 are pivotably connected to each other. Because the pin 112a is pivotable relative to the hole 113b, such connection permits a relative displacement between the crank member 112 and the link member 113.

The link member 113 is pivotable to the right and left in a generally perpendicular plane with respect to the vehicle body, and in this embodiment the pivoting action of the link member 113 is assured by a pin and long aperture engaging system. More particularly, as shown in FIG. 12, a substantially vertically elongated long aperture 113a is formed in the upper portion of the vertically elongated link member 113, and a pin 114 is received in the long aperture 113a and is engaged therewith. The pin 114, as shown in FIG. 13, is fixed to the bracket 111 which constitutes part of the vehicle body, and the link member 113 is pivotable about the pin 114 in the right and left direction with respect to the vehicle body. To the right and left side portions of the lower part of the link member 113 are connected opposed end portions of right and left rear wheel steering tie rods 115 through pins 116. By a stroke to the right or left of the tie rods 115 responsive to a pivotal movement of the link member 113, the rear wheels 103 are steered about the shafts 104a.

A rear wheel steering mechanism is constructed of the crank member 112, link member 113, pin 114 and tie rods 115. In such rear wheel steering mechanism, when the steering wheel 105 is turned, the crank member 112 integrally pivots with the input shaft 110, whereby the link member 113 with its long aperture 113a engaged with the pin 114 is pivoted in the right and left direction with the position of the pin 114 as an instantaneous pivot center while it moves in the vertical direction. As a result, the rear wheels 103 are steered together with steering of the front wheels by the front wheel steering mechanism.

In the above-described construction, the vehicle driver is required to impart a steering torque to the steering wheel 105 for steering both the front and rear wheels, and an auxiliary steering power may be imparted to the steering wheel 105 to reduce the steering torque. To this end, a power cylinder may be attached to each of the front and rear wheel steering mechanisms, or may be attached to either one of the two.

When the vehicle is travelling straight ahead, in other words, when the steering wheel 105 is in the neutral position thereof, as shown in FIG. 12, the crank member 112 assumes a perpendicular orientation with its pin 112a positioned at the top dead center. In this normal position, if the distance between the pin 112a and the pin 114 is $a_o$, the distance between the pin 114 and a line joining right and left pins 116 is $b_o$, the distance between a central line of the crank member 113 passing through the pins 112a and 114 and each of the pins 116 is c, an effective length of the crank member 112, i.e., the distance between the input shaft 110 and the pin 112a, is r and a horizontal moving distance of the pin 116, i.e., the amount of a horizontal stroke of the tie rod 115, when the crank member 112 pivots by an angle of $\alpha_4$, is $x_4$, then if the ratio of effective crank length r to the interpin distance $a_o$ at the top dead center of the crank, i.e., $r/a_o$, is sufficiently small, the following equation is substantially established:

$$x_4/b_o r/a_o \sin 4 - \tfrac{1}{4} \cdot c/b_o (r/a_o)^2 \sin^2 4$$

Figure 14:
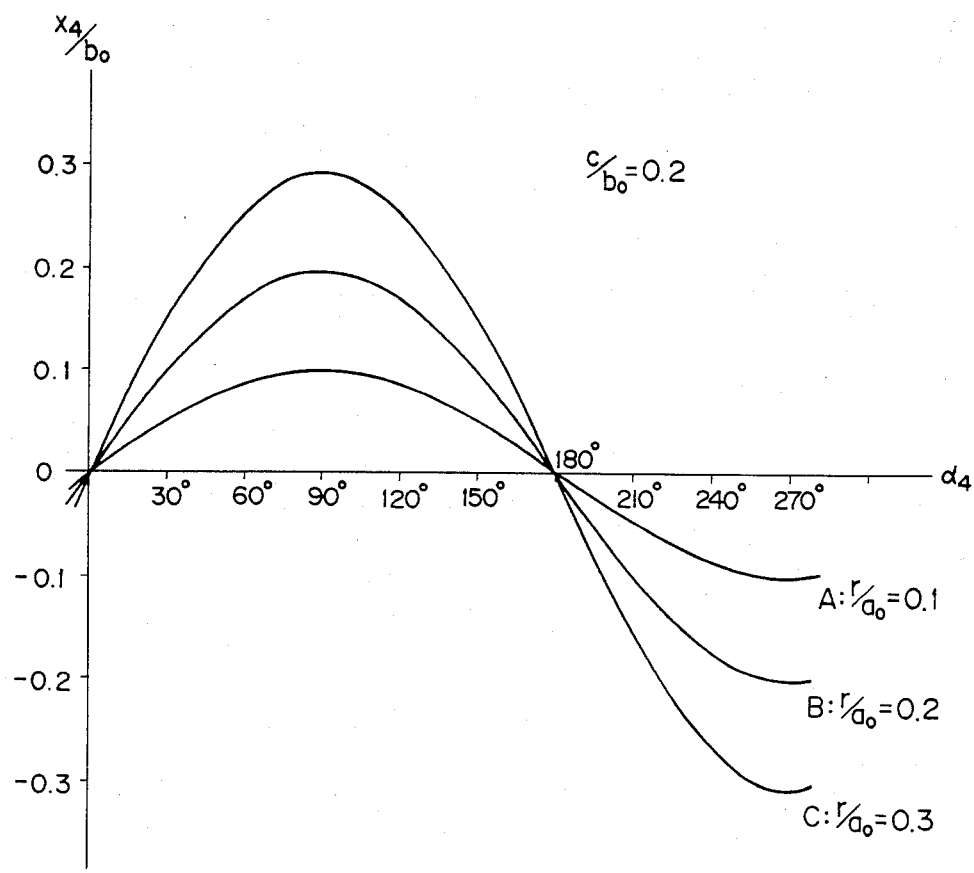
FIG. 14 is a graph showing the relationship between the pivoting angle of a crank member of a rear wheel steering mechanism in the steering system of FIG. 12 and the amount of a horizontal stroke of rearwheel steering tie rods.

In the above equation, if $c/b_o = 0.2$ and $r/a_o = 0.1$, 0.2, 0.3, changes of $x_4/b_o$ relative to $\alpha_4$ are as outlined by curves A, B and C in the graph of FIG. 14.

As apparent from the graph of FIG. 14, the amount of horizontal stroke $x_4$ of the tie rod 115 changes according to the pivotal angle $\alpha_4$ of the crank member 112, i.e., $x_4$ increases with an increase of $\alpha_4$ and becomes maximum when $\alpha_4$ is approximately 90°. Once $\alpha_4$ exceeds this value, $x_4$ begins to decrease, and when $\alpha_4$ reaches 180°, $x_4$ returns to zero, i.e., its normal position. Then after $\alpha_4$ exceeds 180°, the value of $x_4$, i.e., its stroke direction, is reversed and the tie rod 115 begins to move in the opposite direction from its normal position. Again, $x_4$ continues to increase in such opposite direction and when $\alpha_4$ reaches approximately 270° the absolute value of $x_4$ again becomes maximum. Although it is somewhat above 270° of $\alpha_4$ shown in the graph, it is apparent from the foregoing equation that subsequently $x_4$ again returns toward its normal position and further begins to increase in the positive direction. Because the positive and negative values of x are reversed when $\alpha_4$ exceeds 180°, if the steering wheel 105 is rotated in the same direction, the steering direction of the rear wheels 103 becomes reversed at a certain steering angle with the neutral position of the rear wheels when the vehicle is travelling straight ahead as a turning point. Consequently, it is possible to construct the steering system so that when the steering wheel 105 is operated within a relatively small angle, the rear wheels 103 are steered in the same direction as that of the front wheels 101, and when the steering wheel 105 is operated up to a relatively large steering angle, the rear wheels 103 are steered in a direction opposite to that of the front wheels 101. The magnitude of pivotal angle $\alpha_4$ of the crank member 112 when the steering wheel 105 reaches its pivotal limit can be set as desired by providing a speed change mechanism for determining a pivotal angle ratio of the crank member 112 to the steering wheel 105 in a suitable place in the rear wheel steering force transmission path comprising the gear box 109 and the input shaft 110, for example, in the gear box 109. Consequently, in some particular uses of the vehicle, it is also possible to construct the steering system so that when the steering wheel 105 is operated within a relatively small steering angle, the rear wheels 103 are steered in the same direction as that of the front wheels 101 in the same manner as described above, and when the steering wheel 105 is operated at a relatively large steering angle, the steering angle of the rear wheels 103 is returned to zero or close to zero.

Such a relationship between the front wheel steering and rear wheel steering is maintained both in the case in which the steering wheel 105 is turned to the right and the case in which it is turned to the left.

The curves A, B and C in the graph of FIG. 14 show that the value of $x_4/b_o$, in other words, the magnitude of steering angle of the rear wheels 103, can be determined as desired by changing the value of $r/a_o$. It is not always preferable in attaining desired vehicular steerability to make the steering angle of the front wheels 101 identical to that of the rear wheels 103 in steering operation at a small angle, it being preferable from the standpoint of steerability that the rear wheel steering angle be set smaller than the front wheel steering angle. In this embodiment, the value of $x_4$ for determining the steering angle of the rear wheels 103 also depends on $b_o$ and c in addition to the above $a_o$ and r. Therefore, by suitably selecting the value of $a_o$, $b_o$, c and r, it is possible to obtain a ratio of rear wheel steering angle to front wheel steering angle which is considered to be most preferable.

Figure 15:
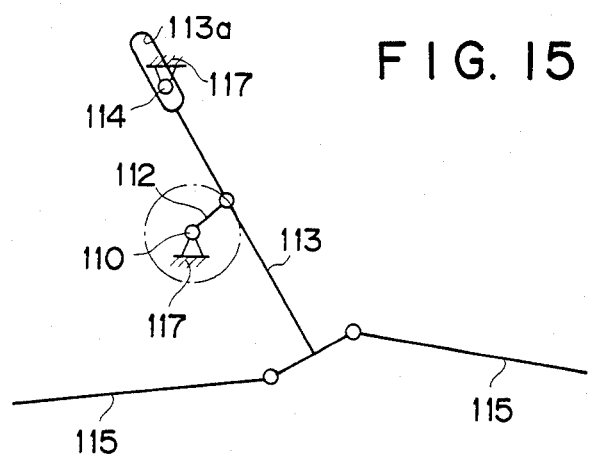
FIG. 15 is a view schematically showing principal portions of the steering system of FIG. 11.

Referring now to FIG. 15, as previously noted, the input shaft 110 and the crank member 112 are pivotably supported by a vehicle body 117 in respective predetermined positions, and the pin 114 fixed to the vehicle body 117 is fitted in the long aperture 113a formed in the link member 113 and is engaged therewith, and the link member 113 is slidably connected to the vehicle body 117 through the pin 114 and the long aperture 113a, whereby a desired horizontal stroke is imparted to the right and left rear wheel steering tie rods 115.

Referring now to FIGS. 16 through 27, reference numerals 120, 130, 140, 150, 160, 170, 180, 190, 200, 210, 220 and 230 each designate input shafts of a rear wheel steering mechanism operatively cooperating with a steering wheel (not shown), numerals 122, 132, 142, 152, 162, 172, 182, 192, 202, 212, 222 and 232 designate crank members, numerals 123, 133, 143, 153, 163, 173, 183, 193, 203, 213, 223 and 233 designate link members, numerals 125, 135, 145, 155, 165, 175, 185, 195, 205, 215, 225 and 235 designate rear wheel steering tie rods, and numerals 127, 137, 147, 157, 167, 177, 187, 197, 207, 217, 227 and 237 designate vehicle bodies defining relatively stationary members.

Figure 16:
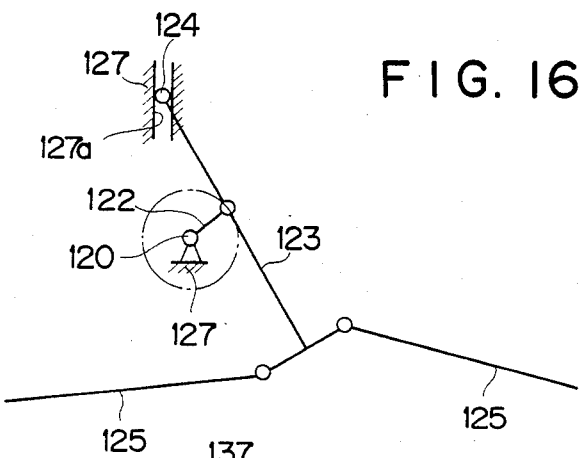
FIGS. 16 through 27 are views schematically showing principal portions of vehicular steering systems in accordance with fifth through sixteenth embodiments of the present invention, respectively.

In the fifth embodiment shown in FIG. 16, contrary to the fourth embodiment described hereinabove, the pin 124 is attached to the link member 123, and a vertically elongated groove 127a for insertion and engagement therewith of the pin 124 is formed in the vehicle body 127. In other words, for slidably connecting the link member 123 to the vehicle body 127 by means of a pin and long groove engaging system, the pin 124 is mounted on the link member 123 side, while the long groove 127a is formed on the vehicle body 127 side.

Figure 17:
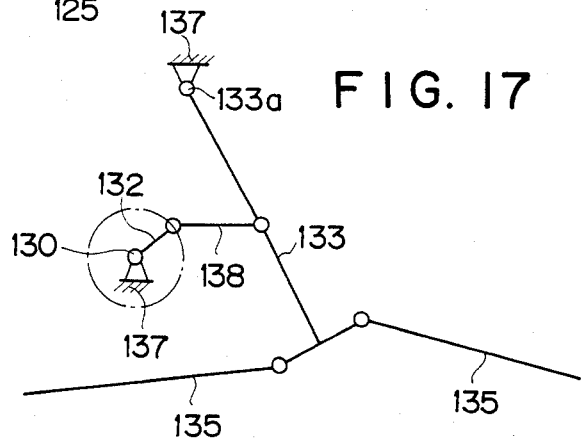

In the sixth embodiment shown in FIG. 17, the steering system has a structure wherein the input shaft 130 and the crank member 132 are supported by the vehicle body 137 in a predetermined position, and despite the fact that the link member 133 is pivotably secured to the vehicle body 137 in another predetermined position by a shaft 133a, a pivotal movement of the crank member 132 can be transmitted to the link member 133 as a pivotal movement in the right and left direction. More specifically, the crank member 132 and the link member 133 are interconnected through an intermediate link member 138 relatively movably, i.e., in such a manner that the tip end of the crank member 132 is movable relative to the link member 133. Consequently, vertical displacement of the crank member 132 is absorbed by a vertical movement of the intermediate link member 138.

Figure 18:
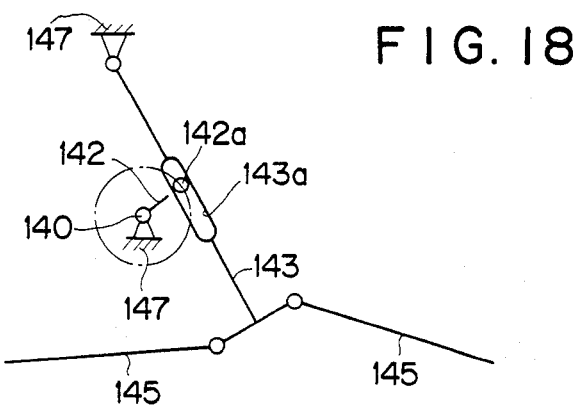
Figure 19:
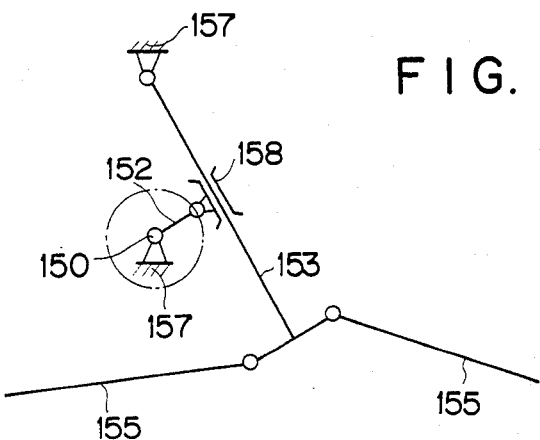

In the seventh and eighth embodiments shown respectively in FIGS. 18 and 19, as in the above-described sixth embodiment, the crank member 142 or 152 and the link member 143 or 153 are interconnected relatively movably. In the seventh embodiment, a long aperture 143a is formed in the link member 143 and a pin 142a attached to the crank member 142 is engaged with the long aperture 143a. On the other hand, in the embodiment shown in FIG. 19, a guide tube member 158 is pivotably secured to the crank member 152 and the link member 153 is slidably inserted through the tube member 158.

Figure 20:
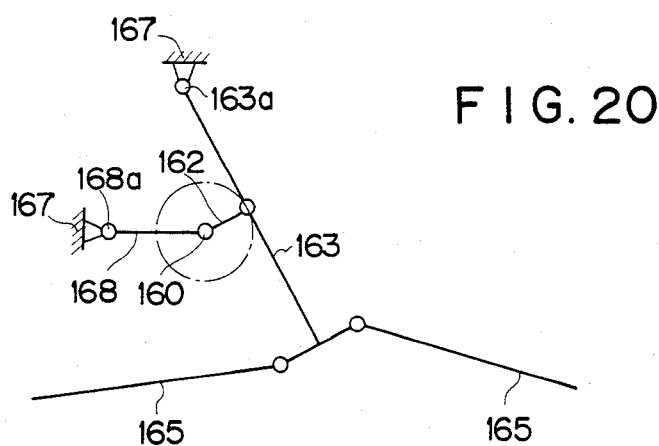
Figure 21:
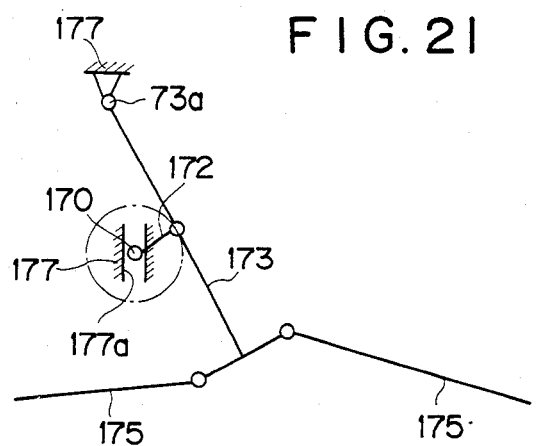

In the ninth and tenth embodiments shown respectively in FIGS. 20 and 21, the crank member 162 or 172 and the link member 163 or 173 are interconnected in a predetermined position as in the fourth embodiment, and despite the fact that the link member 163 or 173 is pivoted to the vehicle body 167 or 177 in a predetermined position by means of a pin 163a or 173a, the link member 163 or 173 can be pivoted in the right and left direction by a pivotal movement of the crank member 162 or 172. In the ninth embodiment, a support link member 168 is vertically pivotably secured at one end thereof to the vehicle body 167 through a shaft 168a, and at the other end thereof the input shaft 160 and the crank member 162 are pivotably supported. Consequently, the input shaft 160 and the crank member 162 are movably supported by the vehicle body 167 through the link member 168, and right and left pivoting of the link member 163 is carried out while a vertical displacement in the pivoting angle of the crank member 162 not contributing to the right and left pivoting of the link member 163 is absorbed by a vertical pivoting of the support link member 168. On the other hand, in the tenth embodiment, the input shaft 170 is fitted in a vertically elongated aperture 177a formed in the vehicle body 177, so that the crank member 172 causes the link member 173 to pivot in the right and left direction while it moves in the vertical direction relative to the vehicle body 177 by virtue of a guide action of the long aperture 177a.

In the ninth and tenth embodiments, a universal joint is mounted in a rear wheel steering force transmission path (not shown), thereby permitting the input shaft 160 or 170 to move relative to the vehicle body 167 or 177 while pivoting.

Figure 22:
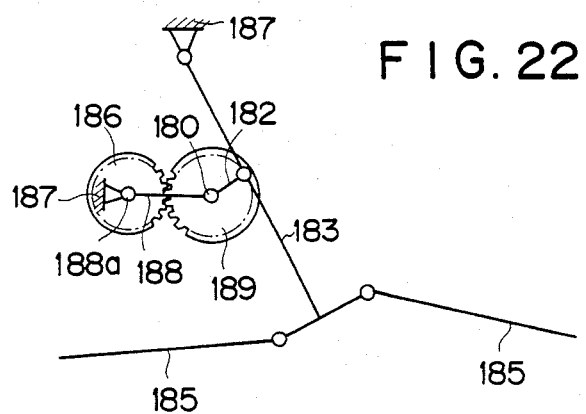

The eleventh embodiment shown in FIG. 22 is an improvement of the ninth embodiment, wherein gears 186 and 189 are pivotably mounted on a pivot shaft 188a of a support link member 188 and the input shaft 180, respectively. By virtue of the meshing engagement between the gears 186 and 189 a link mechanism comprising the crank member 182, link member 183 and support link member 188 is prevented from undergoing an unnecessary free floating to thereby stabilize the position of the input shaft 180.

Figure 23:
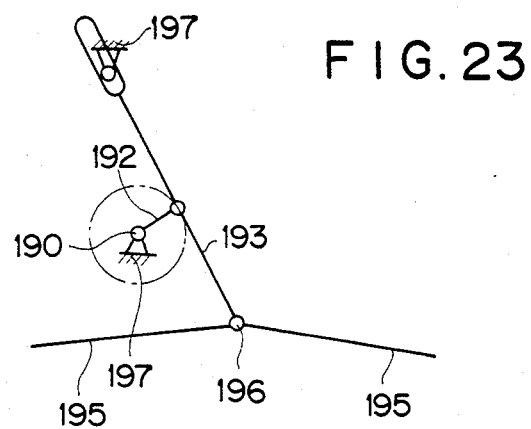

The twelfth embodiment shown in FIG. 23 is an exemplary improvement of the connecting structure between the link member 193 and the right and left rear wheel steering tie rods 195, wherein the right and left tie rods are connected to the link member 193 in common with a single pin 196. In other words, the output points at which the right and left tie rods 195 are connected to the link member 193 overlap each other at the pin 196. It will be understood that such a connection is also applicable to each of the embodiments described hereinabove.

Figures 24, 25, 26, 27:
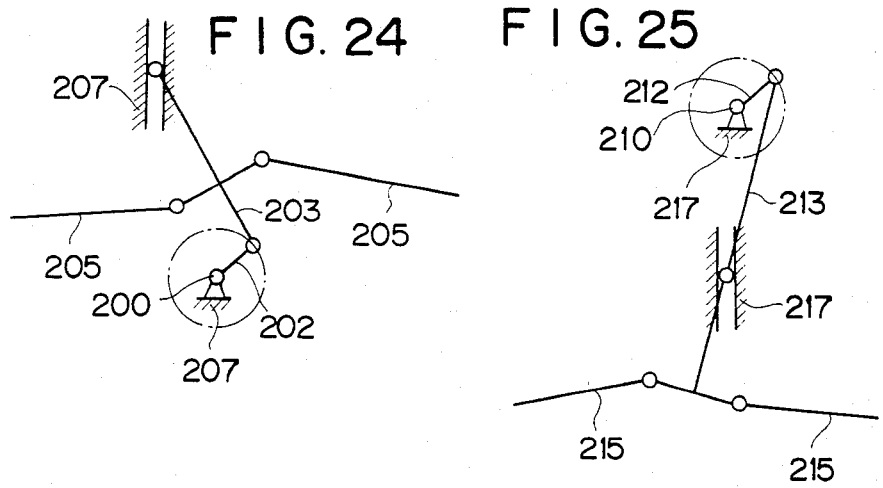

The thirteenth and fourteenth embodiments shown respectively in FIGS. 24 and 25 are exemplary improvements of the connecting position between the link member 203 or 213 and the rear wheel steering tie rods 205 or 215, the connecting position between the link member 203 or 213 and the vehicle body 207 or 217 and that between the link member 203 or 213 and the crank member 202 or 212. In the thirteenth embodiment, the upper end of the link member 203 is connected to the vehicle body 207, the crank member 202 is connected to the lower end of the link member 203, and the tie rods 205 are connected to a substantially intermediate portion in the vertical direction of the link member 203. On the other hand, in the fourteenth embodiment, the crank member 212 is connected to the upper end of the link member 213, the tie rods 215 are connected to the lower end of the link member 213, and the link member 213 is connected to the vehicle body 217 at a substantially intermediate portion in the vertical direction thereof. Such positional relations are also applicable to each of the embodiments described hereinabove.

The fifteenth and sixteenth embodiments shown respectively in FIGS. 26 and 27 are exemplary improvements of the connecting structure of the rear wheel steering tie rods 225 or 235, wherein the right and left tie rods 225 or 235 are interconnected through a tie rod connecting rod 228 or 238 and link member 223 or 233. In the fifteenth embodiment, the rod 228 is supported at both end portions thereof by the link member 223 and a link member 229, the upper end of which is pivotably secured to the vehicle body 227 in the right and left direction. As the link member 223 pivots in the right and left direction upon pivotal movement of the crank member 22, the tie rods 225 and the rod 228 are moved in the right and left direction. On the other hand, in the sixteenth embodiment, an end portion of the rod 238 on the side opposite to its end portion connected to the link member 233 is slidably supported by a bearing 239, the bearing 239 being pivotably secured to the vehicle body 237, thereby permitting the rod 238 to follow a pivotal movement in the right and left direction of the link member 233.

The above-described structure wherein a tie rod connecting rod is interposed between the right and left tie rods is also applicable to each of the embodiments described hereinabove.

Figure 28:
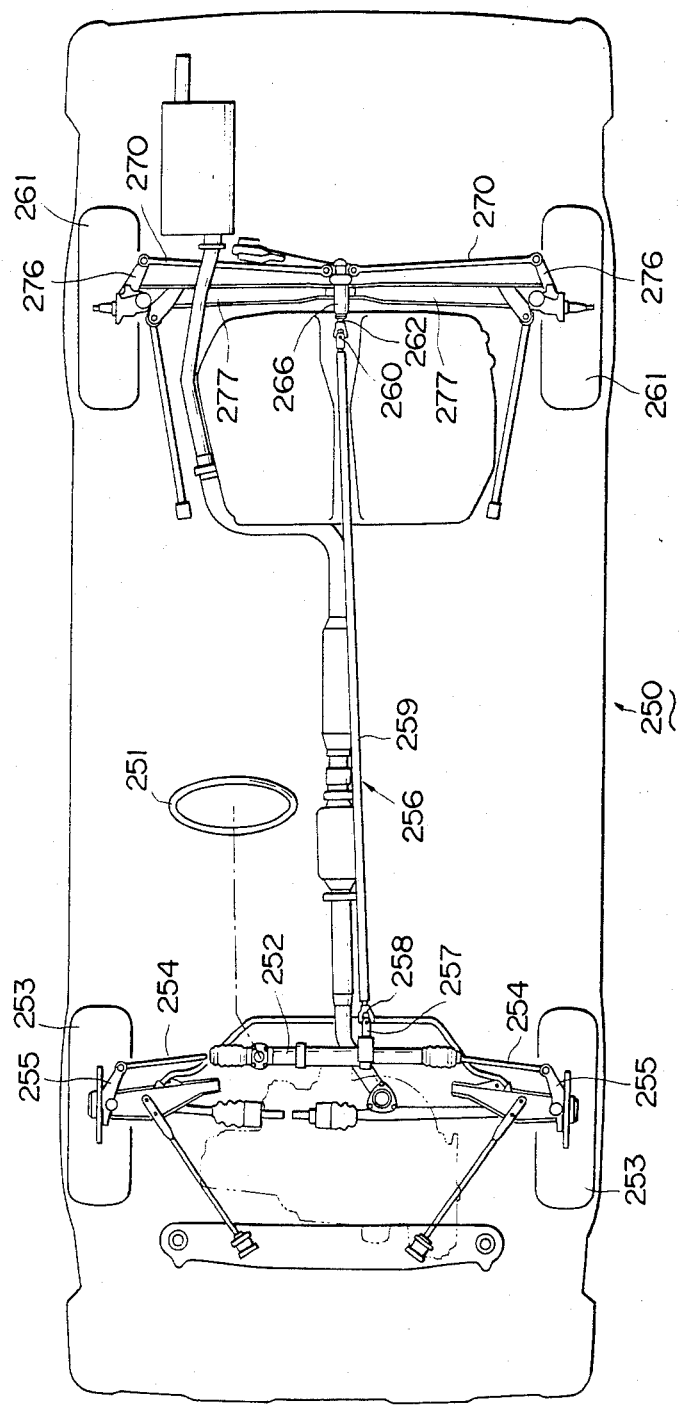
FIG. 28 is a plan view showing principal portions of a four-wheeled vehicle provided with a steering system according to a seventeenth embodiment of the present invention.
Figure 29:
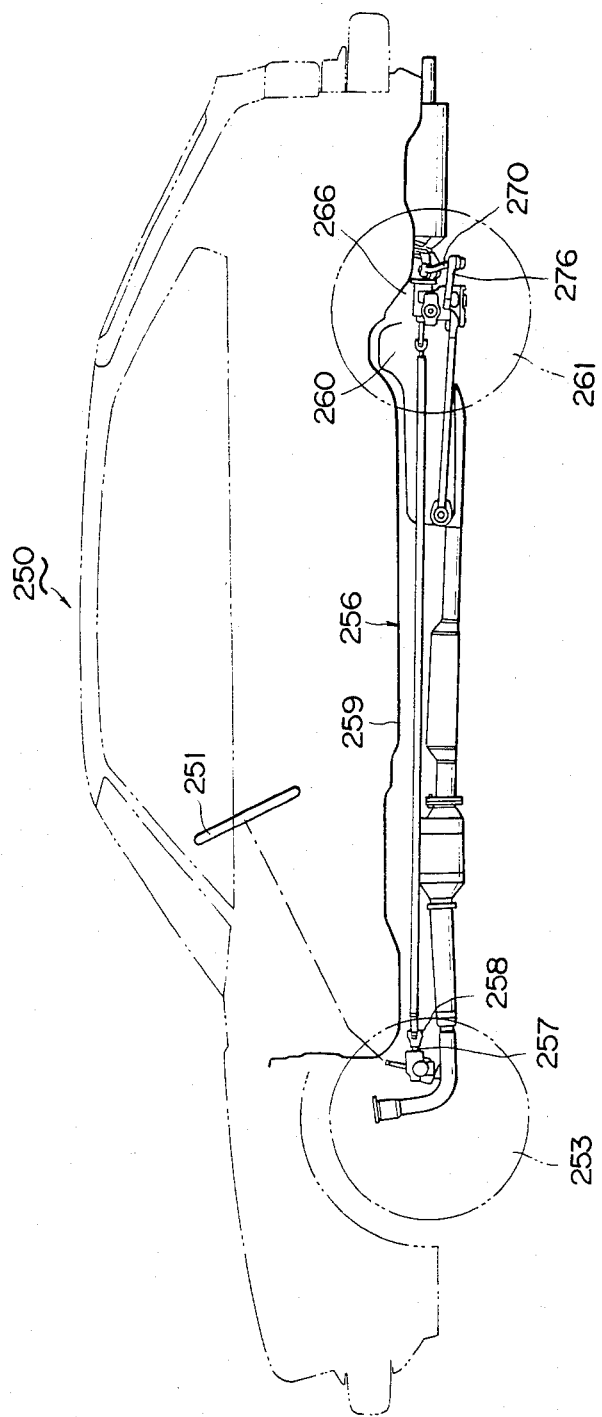
FIG. 29 is a side view showing principal portions of the four-wheeled vehicle of FIG. 28.
Figure 30:
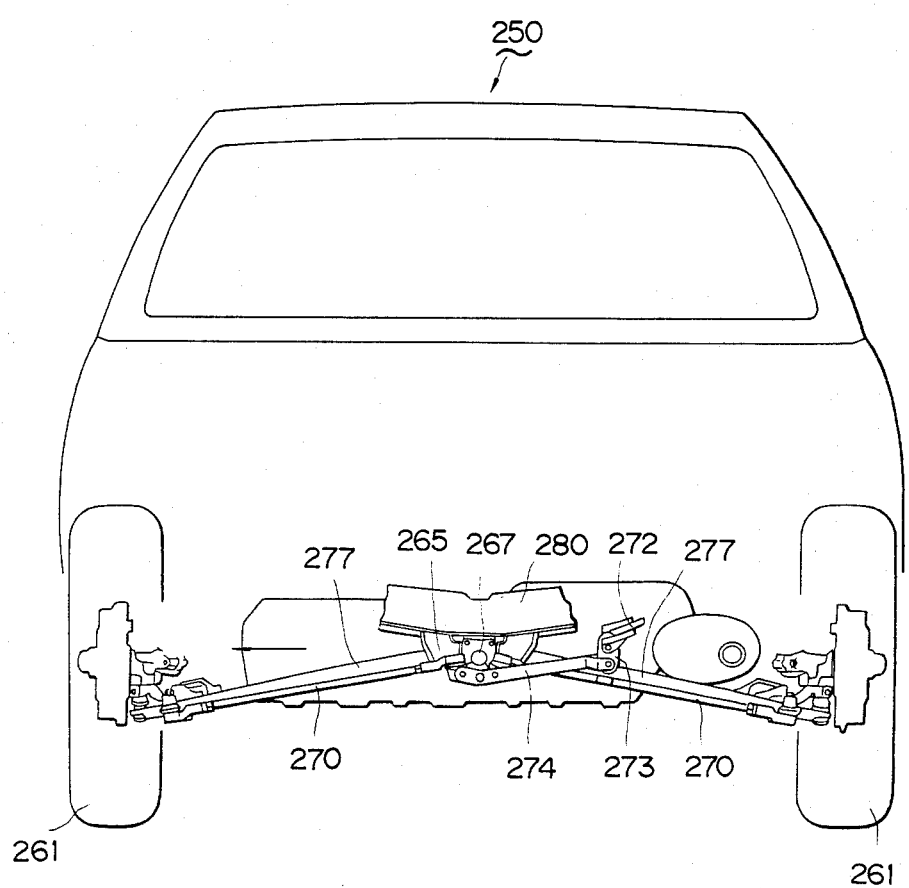
FIG. 30 is a rear view showing principal portions of the four-wheeled vehicle of FIG. 28.

Referring now to FIGS. 28 through 33, reference numeral 250 in FIGS. 28 through 30 represents the entirety of a four-wheeled vehicle, wherein rotating movement of a steering wheel 251 of the vehicle 250 is converted to a transverse movement of steering tie rods 254 for front wheels 253 through a rack and pinion type steering gear 252 to which is attached a power steering device (not shown), and the front wheels 253 are steered by virtue of a pivotal movement of knuckle arms 255 which are connected to the outer ends of the tie rods 254.

A linkage member 256 is connected to a substantially central portion of the steering gear 252 as shown in FIGS. 28 and 29. More specifically, a linkage shaft 259 which extends in the rearward direction of the vehicle body is connected through a universal joint 258 to a pinion shaft 257 which engages a rack (not shown), and a shaft member 262 which constitutes a steering mechanism for rear wheels 261 is connected to the linkage shaft 259 through a universal joint 260.

Figure 31:
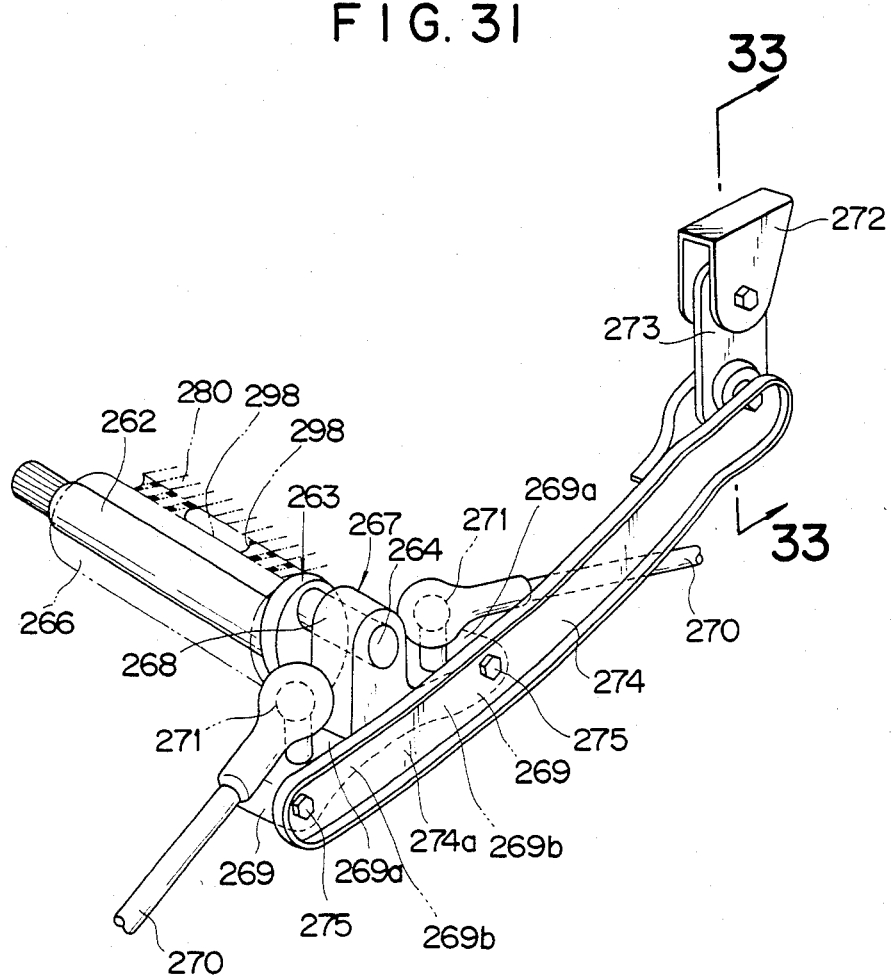
FIG. 31 is an enlarged perspective view showing the construction of the rear portion of the steering system of FIG. 28, partially modified as shown in chain line.
Figure 32:
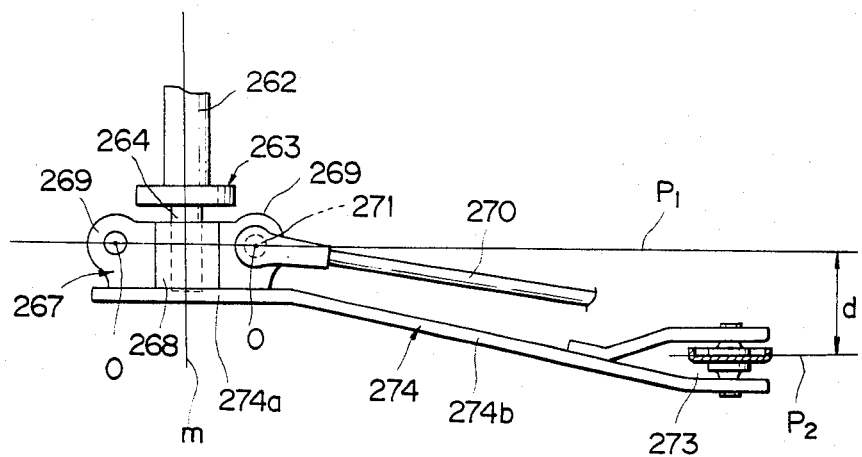
FIG. 32 is a partially cut-away top view of the rear construction of the steering system of FIG. 31.

The shaft member 262 is disposed on a substantially central line of the vehicle body, and at its rear end portion is formed a crank portion 263 having a rearwardly extending crank pin 264, as shown in FIGS. 31 and 32. The shaft member 262, as shown in FIG. 30, is supported by being inserted into a shaft collar 266 which is integrally fixed to a lower arm bracket 265 for the rear wheels secured to a cross member 280 of the vehicle frame.

As shown in FIG. 31, a joint member 267 having a substantially inverted T-shaped front shape is fitted loosely at its upper portion 268 over the crank pin 264, and rear wheel steering tie rods 270 are connected through ball joints 271 to upper surface portions 269a of projecting portions 269 which constitute both right and left lower side portions of the joint member 267.

On the other hand, a link bracket 272 is rigidly suspended from the vehicular floor panel or the like in a position behind and on the right side of the joint member 267, and a link member 273 is pivotably suspended from the link bracket 272. To the lower portion of the link member 273 is pivoted an arm member 274 which is formed relatively long in a substantially intersecting relation to the central line of the vehicle body. A tip end portion 274a of the arm member 274 is fixed by means of two bolts 275 to rear surface portions 269b of the right and left projecting portions 269 of the joint member 267, and by virtue of its restraint action the joint member 267 performs a pivotal movement consisting of vertical and transverse motion components along with a crank motion of the crank pin 264.

In the above-described construction, the arm member 274 which connects the link member 273 suspended from the vehicle body with the joint member 267 fitted over the crank pin 264 is rearwardly bent at its intermediate portion 274b as shown in FIG. 32 to avoid interference thereof with the rear wheel steering tie rod 270 which is connected to the joint member 267 through the ball joint 271, and the link member 273 is also disposed in an offset manner behind the joint member 267. More specifically, the link member 273 is disposed on a plane $P_2$ which is offset rearwardly by a suitable distance d with respect to a plane $P_1$ which is generally orthogonal to a center line m of the crank pin 264 and which passes through the centers 0 of the right and left ball joints 271.

Figure 33:
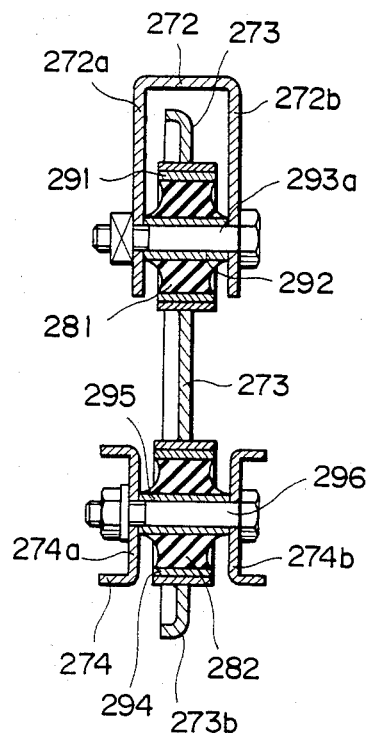
FIG. 33 is an enlarged sectional view taken along line 33—33 of FIG. 31.

Further, as shown in detail in FIG. 33, the link member 273 has its upper portion 273a facing between front and rear depending pieces 272a and 272b of link bracket 272 having a substantially U-shaped section, the upper portion 273a being pivoted to the bracket 272 through large and small diameter sleeves 291 and 292 with a rubber bushing 281 press-fitted therebetween and further by means of a bolt 293. On the other hand, a lower portion 273b of the link member 273 faces between bifurcated front and rear portions 274a and 274b of the pivoted end of the arm member 274, and like the upper portion 273a, is also pivoted to the arm member 274 through large and small diameter sleeves 294 and 295 with a rubber bushing 282 press-fitted therebetween and further by means of a bolt 296. Thus, the arm member 274 is in an elastically-supported state with respect to the vehicle body, and such state is superior in preventing vibration.

More preferably, as sectionally shown in chain line in FIG. 31, the shaft collar 266 is elastically supported by part of the vehicle body as a relatively stationary member, by the cross member 280 in this embodiment, through front and rear rubber mounts 298, whereby the shaft member 262 which is an input member of the rear wheel steering mechanism is held in an elastically-supported state with respect to the vehicle body. The entirety of the rear wheel supporting mechanism is thereby elastically supported with respect to the vehicle body to ensure prevention of vibration.

In FIGS. 28 through 30, reference numeral 276 designates a knuckle arm connected to the outer end of the rear wheel steering tie rod 270, and numeral 277 designates a lower arm for the rear wheel 261.

The vehicular steering system according to the seventeenth embodiment operates in the following manner.

When the steering wheel 251 is in the neutral position thereof in which the vehicle is moving straight ahead, the crank portion is in a substantially perpendicular position with its crank pin 264 positioned, for example, at the bottom dead center.

In this state, if the steering wheel 251 is turned, for example, to the right, the front wheels 253 are also steered to the right and at the same time the shaft member 262 pivots clockwise when viewed from the rear of the vehicle 250 through the linkage member 256 consisting of the pinion shaft 257 extending from the steering gear 252 and the linkage shaft 259 connected thereto. Thus, the crank pin 264 of the crank portion 263 is also pivoted clockwise and the joint member 267 loosely fitted over the pin 264 moves first to the left, so that the tie rods 270 connected to the right and left projecting portions 269 of the joint member 267 having a substantially inverted T-shaped front shape move to the left and the knuckle arms 276 pivot clockwise, thus allowing the rear wheels 261 to be steered to the right together with the front wheels 253.

When the crank pin 264 assumes a substantially horizontal position to the left, the rear wheels 261 reach the maximum steering amount to the right, and thereafter, as the joint member 267 moves to the right until the pin 264 is pivoted upwardly into a substantially perpendicular position, the steering amount of the rear wheels 261 in the right-hand direction is gradually decreased to zero.

Then, along with a further crank motion of the pin 264 in a clockwise direction, the joint member 267 moves to the right from the neutral position thereof, and the rear wheels 261 are steered gradually to the left, oppositely to the front wheels 253, until the pin 264 reaches a substantially horizontal position.

Thereafter, after the leftward steering amount reaches its maximum potential and until the pin 264 is pivoted downwardly again into a substantially perpendicular position, the leftward movement of the joint member 267 causes the leftward steering amount of the rear wheels 261 to be gradually decreased to zero. Also, when the steering wheel 251 is turned to the left, the same operation is performed, but in the direction opposite to the above.

In the foregoing manner, there is defined a steering angle function mechanism capable of steering the rear wheels 261 in the same direction as the front wheels 253 during operation of the steering wheel 251 at relatively small turning angles (up to substantially 180° assuming the neutral position of the crank pin 264 to be 0°), and capable of steering the rear wheels 261 in a direction opposite to that of the front wheels 253 at relatively large turning angles (from about 180° to 360°) of the steering wheel 251, or in the latter case, capable of returning the steering angle of the rear wheels 261 to zero.

The vehicular steering system of the present invention which provides such steering angle functions is constructed in such a manner that the joint member 267, which is formed of a relatively small-sized part having a substantially inverted T-shaped front shape, is fitted at its upper portion 268 over the pin 264, and the rear wheel steering tie rods 270 are connected to the upper surface portions 269a of the projecting portions 269 which constitute right and left lower side portions of the joint member 267. To the rear surface portions 269b of the projecting portions 269 is connected the arm member 274, and further the arm member 274 is pivoted to the link member 273 which is suspended from one side portion of the vehicle in an offset position behind the joint member 267.

Consequently, the lower arms 277 which constitute rear suspension systems can be lengthened according to desired suspension characteristics and their bearing portions can be disposed near the center line of the vehicle body. At the same time, the rear wheel steering tie rods 270 can be compactly disposed in opposed relation to each other near such center line, whereby a compact construction in the vertical direction which is considered very desirable with respect to the overall vehicular structure can be attained.

Further, because the joint member 267 is formed of a small-sized part having a substantially inverted T-shaped front shape and the arm member 274 for assuring the pivotal movement of the joint member 267 is pivoted to the link member 273 which is suspended from one side portion of the vehicle body in an offset position behind the joint member 267, it is possible to reduce the size of the joint member 267 which requires a relatively large strength, and the arm member 274 is effectively prevented from undergoing a large load, thus permitting reduction of its wall thickness, which leads to reduction in weight of the entire system.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A steering system for a vehicle provided with at least one front wheel and two rear wheels; a steering wheel; front wheel steering means for steering said front wheel in directions responsive to turning directions of said steering wheel by angles corresponding to turning angles of said steering wheel; and rear wheel steering means for steering said rear wheels in the same steering directions as said front wheel when turning angles of said steering wheel relatively small, and in directions opposite to the steering directions of said front wheels when said turning angles of said steering wheel are relatively large, wherein:

said rear wheel steering means comprises:

a crank member operatively connected to said steering wheel;

a movable member connected to said crank member;

restriction means for restraining said movable member and permitting said movable member to perform only restricted movements in a predetermined curved pattern;

an output mechanism interconnecting said movable member with each of said rear wheels for effecting said steering of said rear wheels according to components of motion in a predetermined direction of said restricted movements;

said predetermined pattern being disposed on a virtual plane substantially including a straight line in said predetermined direction, said predetermined direction being a substantially transverse direction of said vehicle and said virtual plane being substantially orthogonal to a longitudinal center line of said vehicle;

said restriction means being adapted to move in said virtual plane when restraining said movable member;

said output mechanism comprising a pair of knuckle arm members respectively supporting said rear wheels and being pivotable in a substantially transverse direction of said vehicle, and a pair of rod members each pivotably connected at one end thereof to one of said knuckle arm members and connected at the other end thereof to said movable member;

the width dimension of said movable member in said transverse direction of said vehicle being substantially small relative to the lengths of said rod members; and said other ends of said rod members being connected to said movable member at points equally remote from the connecting point between said crank member and said movable member.

2. A steering system according to claim 1, wherein:

said crank member comprises a shaft portion connected to said steering wheel and pivotable according to said turning angles of said steering wheel, and a crank portion fixed at a base end thereof to said shaft portion and having a predetermined length in the radial direction of said shaft portion; and said movable member is connected to a tip end of said crank portion.

3. A steering system according to claim 2, wherein:

said shaft portion is pivotably supported in a predetermined position relative to the body of said vehicle.

4. A steering system according to claim 3, wherein:

said movable member includes one input point to which is pivotably connected the tip end of said crank portion.

5. A steering system according to claim 4, wherein:

said movable member includes two output points to each of which is connected said other end of one of said rod members.

6. A steering system according to claim 5, wherein:

said restriction means comprises a link member pivotably connected at one end thereof to the body of said vehicle; and said movable member includes one restriction point to which is pivotably connected the other end of said link member.

7. A steering system according to claim 6, wherein:

said predetermined pattern exists on substantially one virtual plane; and said movable member comprises a plate member disposed substantially parallel to said virtual plane.

8. A steering system according to claim 7, wherein:

said plate member is provided with said restriction point on the same side thereof as said input point with respect to a virtual straight line joining said two output points.

9. A steering system according to claim 8, wherein:

said restriction point is disposed in a position spaced from said input point with respect to said virtual straight line.

10. A steering system according to claim 8, wherein:

said restriction point is disposed in a position closer than said input point with respect to said virtual straight line.

11. A steering system according to claim 7, wherein:

said plate member is provided with said restriction point on the side thereof opposite to said input point with respect to said virtual straight line joining said two output points.

12. A steering system according to claim 6, wherein:

said movable member comprises a joint member which is substantially inverted T-shaped when viewed from the axial direction of said shaft portion of said crank member, and a substantially horizontally extending arm member fixed at one end portion thereof to said joint member, said joint member comprising a substantially upwardly extending head portion and two substantially horizontally projecting portions.

13. A steering system according to claim 12, wherein:

said one end portion of said arm member is fixed to each of said projecting portions of said joint member.

14. A steering system according to claim 12, wherein:

said arm member is provided with said restriction point at the other end portion thereof.

15. A steering system according to claim 14, wherein:

said vehicle is provided with two rear suspension systems for said rear wheels; and said one end portion of said arm member is disposed in substantially close proximity and substantially parallel to a member of one of said rear suspension systems, which member extends in a substantially transverse direction of said vehicle, with the other end portion of said arm member being offset rearwardly in a substantially longitudinal direction of said vehicle.

16. A steering system according to claim 12, wherein:
said joint member is provided at said head portion thereof with said input point and at said projecting portions thereof with said output points.

17. A steering system according to claim 6, wherein:
said one end and said other end of said link member are connected by means of a rubber member to said vehicle body and said movable member, respectively.

18. A steering system according to claim 5, wherein:
said restriction means comprises a pin member fixed to said vehicle body; and
said movable member is provided with an elongated groove in which is loosely fitted said pin member.

19. A steering system according to claim 18, wherein:
said two output points of said movable member substantially overlap each other.

20. A steering system according to claim 5, wherein:
said restriction means comprises an elongated groove formed in said vehicle body; and
said movable member is integrally provided with a pin member loosely fitted in said elongated groove.

21. A steering system according to claim 20, wherein:
said movable member is provided with said pin member on the same side thereof as said input point with respect to a virtual straight line joining said two output points.

22. A steering system according to claim 21, wherein:
said pin member is disposed in a position spaced from said input point with respect to said virtual straight line.

23. A steering system according to claim 21, wherein:
said pin member is disposed in a position closer than said input point with respect to said virtual straight line.

24. A steering system according to claim 20, wherein:
said movable member is provided with said pin member on the side thereof opposite to said input point with respect to a virtual straight line joining said two output points.

25. A steering system according to claim 3, wherein:
said restriction means comprises a stationary member of said vehicle body to which is pivotally connected one point of said movable member.

26. A steering system according to claim 25, wherein:
said movable member is provided with an elongated aperture; and
said crank portion of said crank member is integrally provided at the tip end thereof with a pin member which is loosely fitted in said elongated aperture.

27. A steering system according to claim 25, wherein:
said movable member has a tubular member slidably fitted thereover; and
the tip end of said crank portion is pivotally connected to one point of said tubular member.

28. A steering system according to claim 25, wherein:
the tip end of said crank portion is connected to said movable member through a link member.

29. A steering system for a vehicle provided with at least one front wheel and at least one rear wheel; a steering wheel; front wheel steering means for steering said front wheel in directions responsive to turning directions of said steering wheel by angles corresponding to turning angles of said steering wheel; and rear wheel steering means for steering said rear wheel in the same steering directions as said front wheel when said turning angles of said steering wheel are relatively small, and in directions opposite to the steering directions of said front wheel when said turning angles of said steering wheel are relatively large, wherein:
said rear wheel steering means comprises:
a crank member operatively connected to said steering wheel;
a movable member connected to said crank member;
restriction means for restraining said movable member and permitting said movable member to perform only restricted movements in a predetermined curved pattern;
an output mechanism interconnecting said movable member and said rear wheel for effecting said steering of said rear wheel according to components of motion in a predetermined direction of said restricted movements;
said crank member comprising a shaft portion connected to said steering wheel and pivotable according to said turning angles of said steering wheel, and a crank portion fixed at a base end thereof to said shaft portion and having a predetermined length in the radial direction of said shaft portion;
said movable member being connected to a top end of said crank portion;
said shaft portion being pivotably supported in a predetermined position relative to the body of said vehicle;
said restriction means comprising a stationary member of said vehicle body to which pivotably connected one point of said movable member;
the tip end of said crank portion being connected to said movable member through a link member; and
said movable member being connected to said output mechanism through another link member.

30. A steering system according to claim 29, wherein:
said another link member is slidably inserted through a tubular member which is pivotably secured to another stationary member of said vehicle body.

31. A steering system according to claim 29, wherein:
said another link member is connected at the end portion thereof on said output mechanism side to another stationary member of said vehicle body through still another link member.

32. A steering system according to claim 2, wherein:
said shaft portion of said crank member is pivotally connected to a stationary member of the body of said vehicle through a link member.

33. A steering system according to claim 32, wherein:
said restriction means comprises another stationary member of said vehicle body to which is pivotally connected said movable member.

34. A steering system according to claim 33, wherein:
said crank portion of said crank member includes a meshing mechanism connected to said link member.

35. A steering system according to claim 3, wherein:
said shaft portion is pivotally inserted into a shaft collar and is supported thereby, said shaft collar being secured to a cross member which constitutes a body frame of said vehicle.

36. A steering system according to claim 35, wherein:
said shaft collar is elastically supported by said cross member.

37. A steering system according to claim 1, wherein:
the steering angles of said rear wheel at said relatively large turning angles of said steering wheel are substantially zero.

* * * * *